(12) United States Patent
Trent et al.

(10) Patent No.: US 11,858,641 B2
(45) Date of Patent: Jan. 2, 2024

(54) AIRCRAFT MOISTURE CONTROL

(71) Applicant: THE BOEING COMPANY, Chicago, IL (US)

(72) Inventors: Michael L. Trent, Everett, WA (US); Warren A. Atkey, Bend, OR (US)

(73) Assignee: THE BOEING COMPANY, Chicago, IL (US)

( * ) Notice: Subject to any disclaimer, the term of this patent is extended or adjusted under 35 U.S.C. 154(b) by 727 days.

(21) Appl. No.: 16/662,793

(22) Filed: Oct. 24, 2019

(65) Prior Publication Data

US 2021/0122476 A1 Apr. 29, 2021

(51) Int. Cl.
*B64D 13/08* (2006.01)
*B64D 13/06* (2006.01)
*B64F 5/60* (2017.01)
*B64D 41/00* (2006.01)

(52) U.S. Cl.
CPC ............. *B64D 13/08* (2013.01); *B64D 13/06* (2013.01); *B64F 5/60* (2017.01); *B64D 41/00* (2013.01); *B64D 2013/064* (2013.01); *B64D 2013/0611* (2013.01); *B64D 2013/0618* (2013.01); *B64D 2013/0655* (2013.01); *B64D 2013/0662* (2013.01); *B64D 2013/0688* (2013.01)

(58) Field of Classification Search
CPC ........ B64D 13/08; B64D 13/06; B64D 41/00; B64D 2013/064; B64D 2013/0618; B64D 2013/0611; B64D 2013/0655; B64D 2013/0662; B64D 2013/0688; B64F 5/60
See application file for complete search history.

(56) References Cited

U.S. PATENT DOCUMENTS

| 4,742,760 A * | 5/1988 | Horstman | B64D 13/00 454/76 |
| 5,386,952 A | 2/1995 | Nordstrom et al. | |
| 6,216,981 B1 * | 4/2001 | Helm | B64D 13/06 454/76 |

(Continued)

FOREIGN PATENT DOCUMENTS

| EP | 207253 A * | 1/1987 | G01M 3/045 |
| EP | 3369661 A1 * | 9/2018 | B64F 1/362 |

OTHER PUBLICATIONS

EP 207253 A mt (Year: 1987).*

(Continued)

*Primary Examiner* — Gordon A Jones
(74) *Attorney, Agent, or Firm* — Moore Intellectual Property Law, PLLC

(57) ABSTRACT

An aircraft includes a fuselage defining a cabin region and a crown region. The aircraft also includes a duct disposed within the fuselage. The duct is coupled to one or more drying air vents disposed in the crown region and coupled to one or more cabin vents disposed with the cabin region. The one or more drying air vents are configured to output drying air, received via the duct, into the crown region, and the one or more cabin vents are configured to output conditioned air, received via the duct, into the cabin region. The aircraft further includes one or more valves coupled to the duct and configured to, in a first valve position, route airflow within the duct to the one or more drying air vents and configured to, in a second valve position, route the airflow within the duct to the one or more cabin vents.

22 Claims, 9 Drawing Sheets

(56) References Cited

U.S. PATENT DOCUMENTS

| | | | | |
|---|---|---|---|---|
| 6,491,254 | B1* | 12/2002 | Walkinshaw | B64D 13/00 244/119 |
| 7,871,038 | B2* | 1/2011 | Space | B64D 13/06 454/71 |
| 8,206,475 | B2* | 6/2012 | Walkinshaw | F24F 5/0085 55/385.2 |
| 9,376,212 | B2 | 6/2016 | Liebich | |
| 9,643,728 | B2 | 5/2017 | Koerner et al. | |
| 2008/0283663 | A1 | 11/2008 | Space et al. | |
| 2012/0199315 | A1* | 8/2012 | Barreau | B64D 13/00 165/42 |
| 2016/0229548 | A1* | 8/2016 | Klimpel | B64D 13/06 |
| 2017/0036769 | A1* | 2/2017 | Humfeldt | B64C 1/067 |
| 2017/0146303 | A1* | 5/2017 | Mayo | B64D 13/00 |
| 2018/0251235 | A1* | 9/2018 | Bolton | B64F 1/362 |
| 2018/0281990 | A1* | 10/2018 | Fagan | H04L 67/75 |
| 2020/0377216 | A1* | 12/2020 | Pearson | F25B 21/04 |
| 2021/0122477 | A1 | 4/2021 | Trent et al. | |
| 2022/0063816 | A1* | 3/2022 | Haruki | B64D 13/08 |

OTHER PUBLICATIONS

Hunt, et al., "Commercial Airliner Environmental Control System", Engineering Aspects of Cabin Air Quality, 8 pgs.

"How It Works—CTT Systems—Humidity in Balance" https://www.ctt.se/zonal-drying/how-it-works/, printed Jun. 6, 2019, 2 pgs.

* cited by examiner

AIRCRAFT MOISTURE CONTROL

FIELD OF THE DISCLOSURE

The present disclosure is generally related to systems and methods for controlling moisture on-board an aircraft.

BACKGROUND

Aircraft are exposed to a wide range of temperatures during operation. For example, depending on the route an aircraft is flying, the aircraft could take-off from a location with a ground level temperature of 35° C. or more, and then cruise at an altitude of over 10 kilometers (e.g., about 33,000 feet) where the ambient temperature is generally less than −40° C. While interior spaces within the aircraft are usually climate controlled, the extreme temperature outside the aircraft can cause humidity within the aircraft to condense on surfaces and structures. This condensation can accumulate as moisture on and within insulation blankets, interior walls, and other locations within certain regions of the aircraft. Over time, the accumulation of such condensation can lead to reduced effectiveness of the insulation, increased structural corrosion, water dripping on passengers and equipment, and increased the weight of the aircraft (which can impact fuel consumption).

To mitigate moisture accumulation, some aircraft include special drying equipment and ducting to generate dry air and distribute that dry air within the aircraft. However, the drying equipment and ducting is heavy and expensive, which offsets some of the benefit gained by drying.

Additionally, the amount of condensation that any particular aircraft experiences varies depending on many factors, such as the aircraft's flight schedule and route, the ambient humidity levels, time of year, and a passenger loading factor (which is related to the number of passengers transported). For example, if an aircraft operates primarily along a route between a hot, humid tropical region and a cold artic or sub-arctic region, the aircraft may experience more condensation (due to both high humidity levels and temperature changes) than if the same aircraft operated primarily along a route between two more temperate locations. As another example, if the aircraft operates primarily along a very popular route (and therefore regularly flies with a full load of passengers), the aircraft is likely to experience more condensation (due to a high passenger loading factor) than if the same aircraft operated primarily along a less popular route. Thus, the benefit of on-board moisture control can vary over the lifetime of the aircraft, as the aircraft changes routes, flight schedules, or operating procedures. However, it is not economically feasible to remove or install the drying equipment and ducting if the aircraft changes routes. As a result, aircraft can bear the burden (weight, maintenance, cost) of carrying added drying equipment when the effectiveness, usefulness, or need may be insignificant.

SUMMARY

In a particular implementation, an aircraft includes a fuselage defining a cabin region and a crown region. The crown region is separated from the cabin region by a cabin ceiling structure. The aircraft also includes a duct disposed within the fuselage. The duct is coupled to one or more drying air vents disposed in the crown region and coupled to one or more cabin vents disposed with the cabin region. The one or more drying air vents are configured to output drying air, received via the duct, into the crown region, and the one or more cabin vents are configured to output conditioned air, received via the duct, into the cabin region. The aircraft further includes one or more valves coupled to the duct and configured to, in a first valve position, route airflow within the duct to the one or more drying air vents and configured to, in a second valve position, route the airflow within the duct to the one or more cabin vents.

In another particular implementation, an aircraft includes a fuselage defining a cabin region and a crown region. The crown region is separated from the cabin region by a cabin ceiling structure. The aircraft also includes a duct disposed within the fuselage and coupled to one or more vents disposed in the crown region. The aircraft further includes one or more valves coupled to the duct and configured to, during operation in a first mode, route recirculation air from the crown region to a recirculation fan via the duct and during operation in a second mode, route drying air from a drying air source to the crown region via the duct.

In another particular implementation, a method includes receiving sensor data indicative of condensed moisture in a crown region of a fuselage of an aircraft. The crown region is separated from a cabin region of the fuselage by a cabin ceiling structure. The method also includes, responsive to a determination that the sensor data indicates detection of a threshold level of condensed moisture in the crown region, determining a flight status of the aircraft. The method further includes, responsive to the flight status of the aircraft satisfying a drying condition, causing drying air to be provided from a drying air source to one or more drying air vents in the crown region.

In another particular implementation, a method includes receiving input to initiate a drying operation to reduce moisture in an aircraft, and responsive to the input, initiating the drying operation by routing drying air from a first region of the aircraft to a second region of the aircraft. The second region corresponds to a crown region of the aircraft. The first region is distinct from the second region and is separated from the second region by at least a cabin ceiling structure.

In another particular implementation, an aircraft includes a fuselage including a crown region separated from one or more other regions by at least a cabin ceiling structure. The aircraft further includes a duct disposed within the fuselage and extending between at least the crown region and another region of the fuselage. The aircraft also includes one or more vents disposed in the crown region and coupled to the duct. The aircraft further includes one or more on-board air sources coupled to the duct and configured to, during operation in a drying mode, route drying air from the other region of the fuselage to the one or more vents via the duct.

The features, functions, and advantages described herein can be achieved independently in various implementations or may be combined in yet other implementations, further details of which can be found with reference to the following description and drawings.

DETAILED DESCRIPTION

Figure 1A:
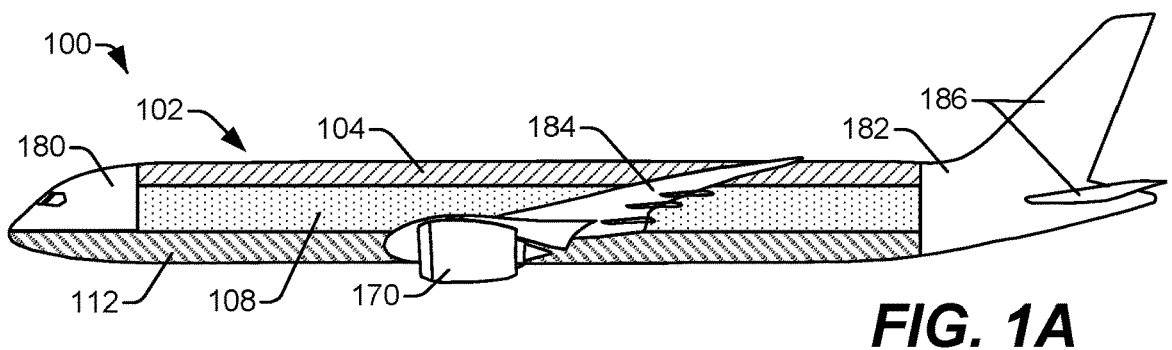
FIG. 1A is a diagram illustrating various regions and structures of an aircraft according to a particular example.

Aspects disclosed herein present systems and methods for controlling moisture on board an aircraft. Rather than adding expensive and heavy single-purpose moisture control equipment and ducting, the disclosed systems and methods reuse components of and ducting of an aircraft's environmental control system to provide moisture control.

Many aircraft include environmental control systems to generate and distribute conditioned air within the aircraft. Such environmental control system are often able to control both the temperature and the humidity level of the conditioned air that is distributed within the aircraft. Generally, such systems route the conditioned air in a manner that provides for the comfort of passengers and crew (and in some cases cargo), rather than for maintenance purposes, such as moisture control. In the disclosed systems, control features, such as vents and valves, are added to the environmental control system to enable re-routing of air via ducting of the environmental control system for moisture control. The added control features are significantly lighter and cheaper than dedicated drying equipment and associated ducting. Accordingly, the weight and cost of aircraft using the disclosed systems and methods for moisture control is less than the weight and cost of a similar aircraft that uses dedicated drying equipment and ducting for moisture control. Further, the disclosed systems and methods can improve operational flexibility of aircraft operators because the disclosed systems are light enough to be cost effective even on routes associated with relatively little condensation.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each. In some cases, such as where the features are separately referred to in the following description, the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2C, multiple air conditioning packs are illustrated and associated with reference numbers 150A and 150B. When referring to a particular one of these air conditioning packs, such as the first air conditioning pack 150A, the distinguishing letter "A" is used. However, when referring to any arbitrary one of these air conditioning packs or to these air conditioning packs as a group, the reference number 150 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an aircraft 100 including one or more air conditioning packs ("air conditioning pack(s)" 150 in FIG. 1), which indicates that in some implementations the aircraft 100 includes a single air conditioning pack 150 and in other implementations the aircraft 100 includes multiple air conditioning packs 150. For ease of reference herein, such features may be introduced as "one or more" features, and subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1B:
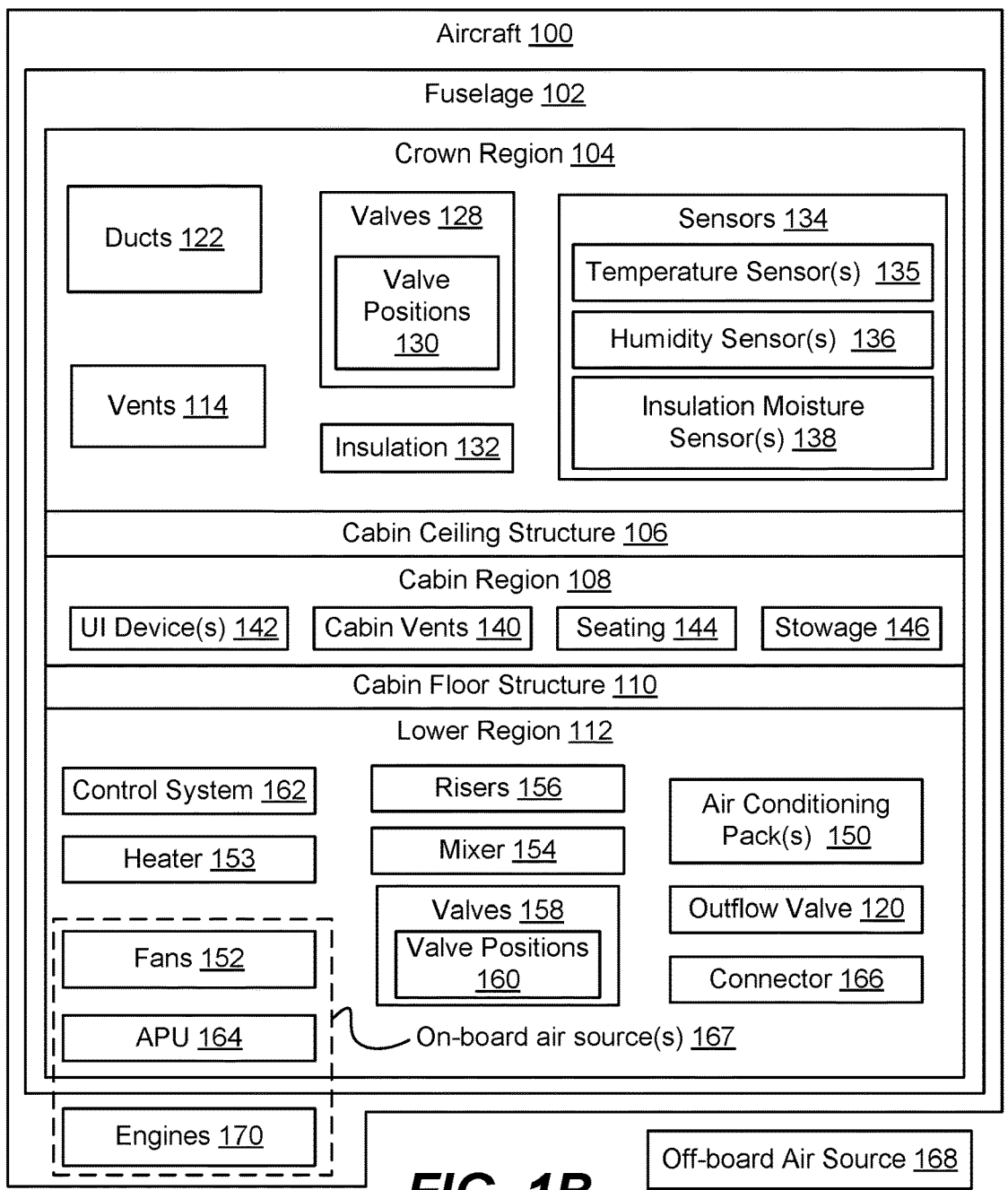
FIG. 1B is a block diagram that illustrates an example of an aircraft that includes a moisture control system.

FIG. 1A is a diagram illustrating various regions and structures of an aircraft 100 according to a particular example, and FIG. 1B is a block diagram that illustrates components of a moisture control system of the aircraft 100. In the example illustrated in FIG. 1A, the aircraft 100 includes a fuselage 102, and wings 184 and control surfaces 186 are coupled to the fuselage 102. Additionally, one or more engines 170 are coupled to the wings 184, the fuselage 102, or both.

The fuselage 102 is divided into various functional regions, including a crown region 104, a cabin region 108, and a lower region 112. In the particular example illustrated, the functional regions also include a cockpit region 180 and an aft region 182. In other examples, the cockpit region 180, the aft region 182, or both, are combined with one of the other regions. The various regions are separated from one another by bulkheads, walls, and other similar structures. The aircraft 100 can also include insulation 132 to reduce heat and noise transfer between the various regions of the aircraft 100 as well as between an interior of the aircraft 100 and an ambient environment around the aircraft 100.

In FIG. 1B, the crown region 104 is separated from the cabin region 108 by a cabin ceiling structure 106, and the lower region 112 is separated from the cabin region 108 by a cabin floor structure 110. Generally, the cabin region 108 is configured to support transportation functions, and the crown region 104 and the lower region 112 house equipment to support operation of the aircraft 100. To illustrate, in the example illustrated in FIG. 1B, the cabin region 108 includes seating 144 to accommodate passengers and crew and includes stowage 146 to accommodate cargo. In other examples, the stowage 146 or a portion of the stowage 146 is located in another of the regions of the aircraft 100, such as in the lower region 112 or the aft region 182. The cabin region 108 also includes cabin vents 140 to provide conditioned air into the cabin region 108.

Figure 2A:
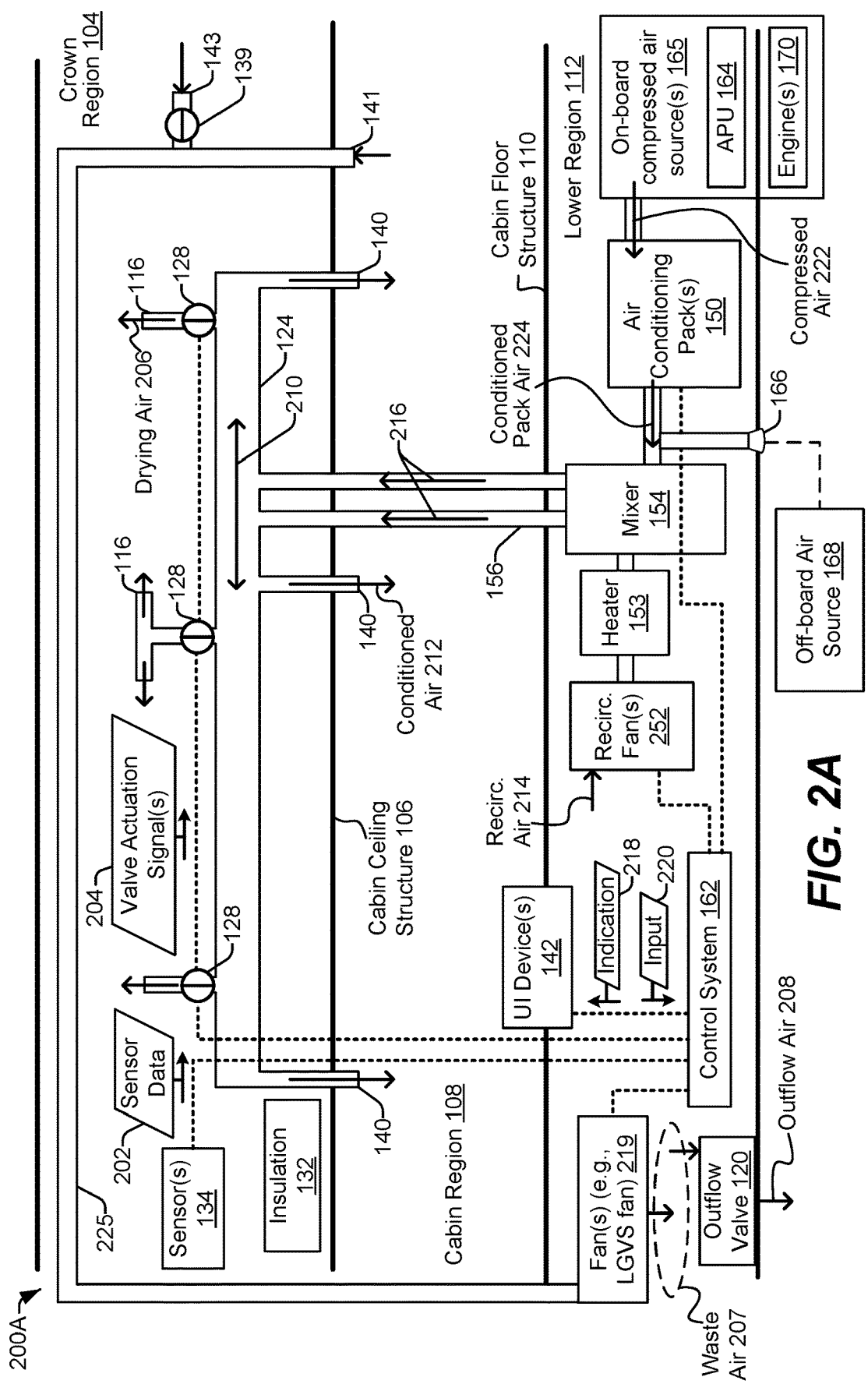
FIG. 2A is a diagram that illustrates a portion of the aircraft of FIGS. 1A and 1B and a first example of the moisture control system of FIG. 1B.
Figure 2B:
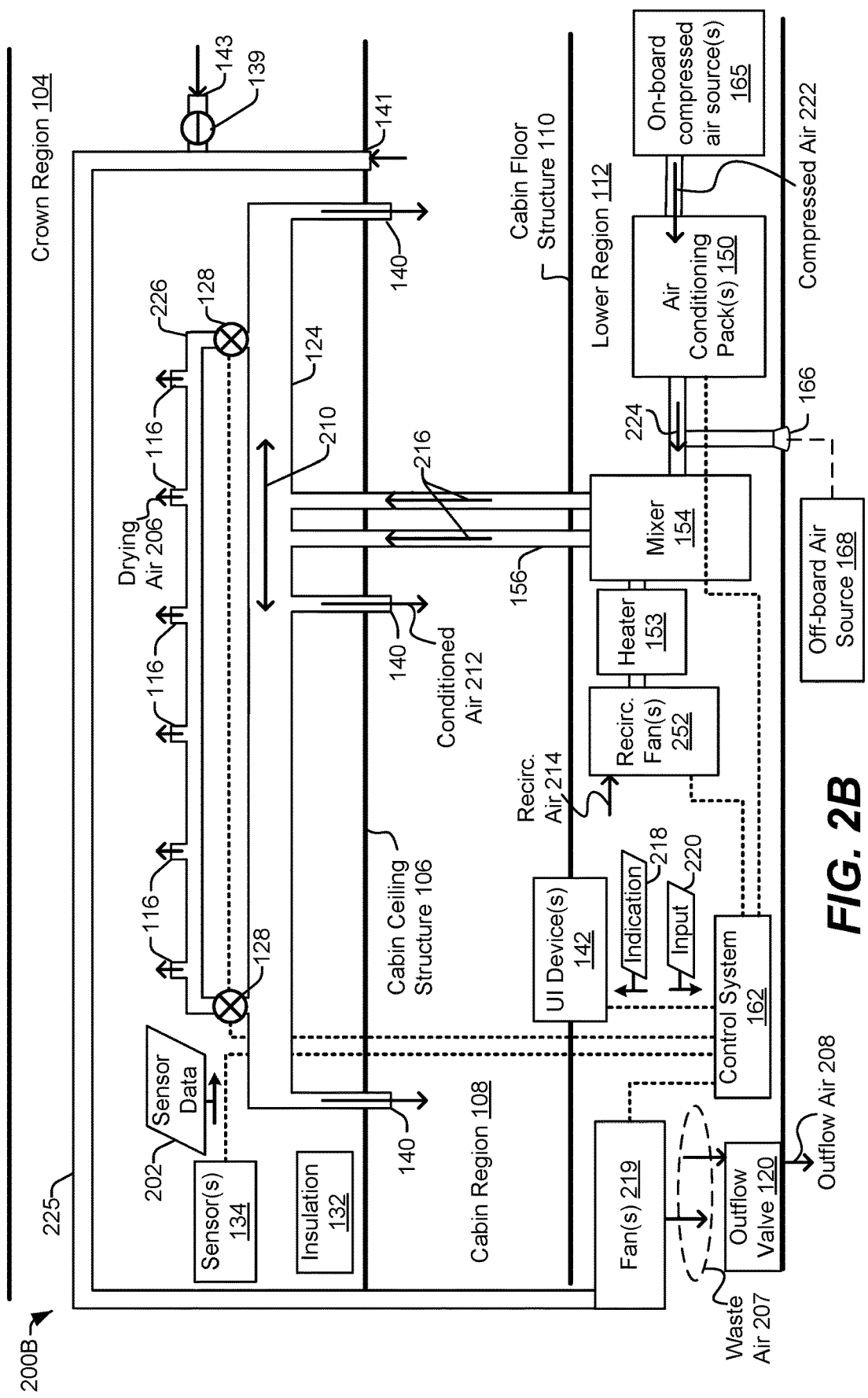
FIG. 2B is a diagram that illustrates a portion of the aircraft of FIGS. 1A and 1B and a second example of the moisture control system of FIG. 1B.
Figure 2C:
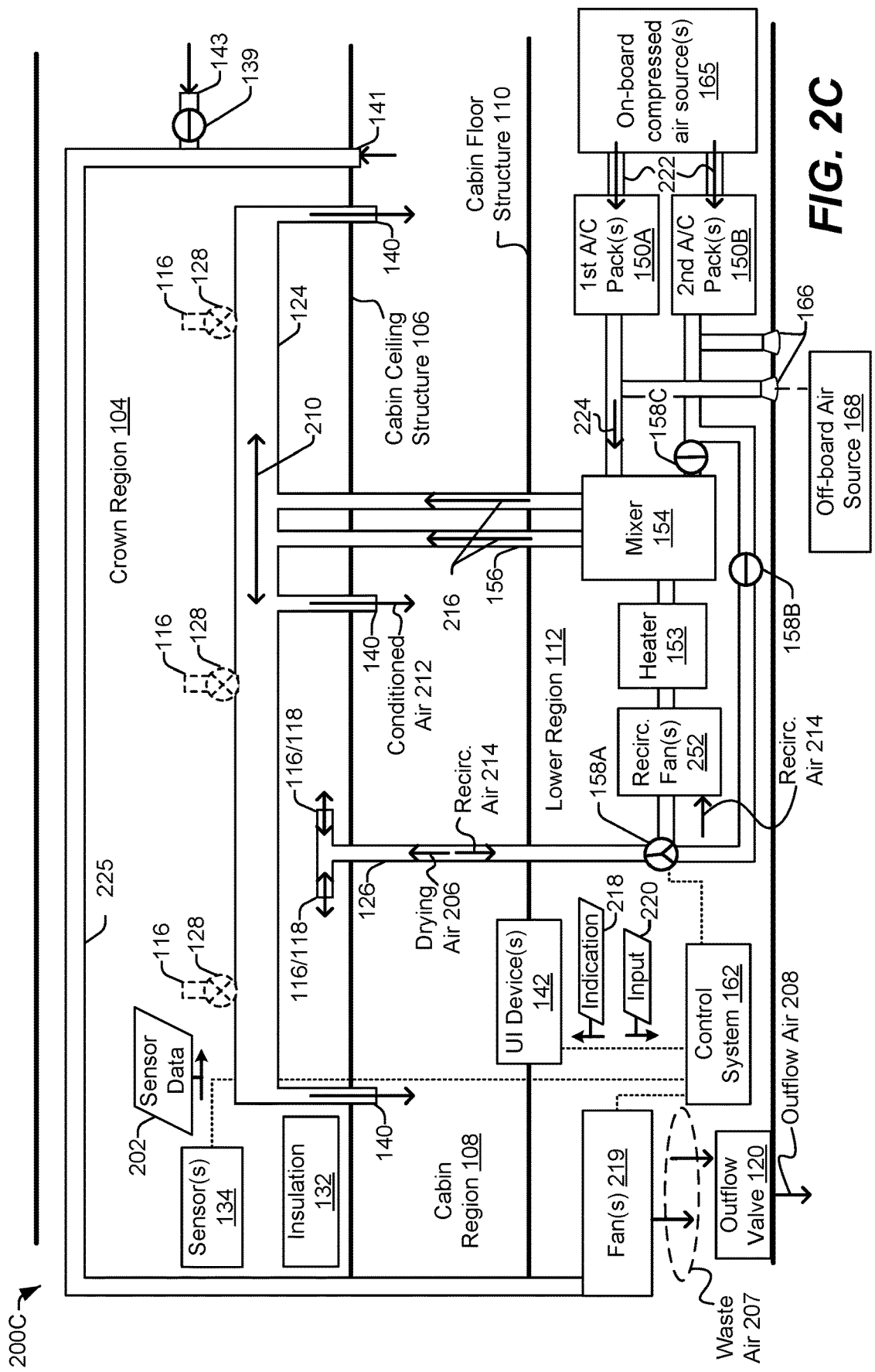
FIG. 2C is a diagram that illustrates a portion of the aircraft of FIGS. 1A and 1B and a third example of the moisture control system of FIG. 1B.

As a further illustration, in FIG. 1B, the crown region 104 includes ducts 122, such as one or more of an overhead supply duct 124, or a ventilation duct 225 as illustrated in FIGS. 2A-2D, a return air duct 126 as illustrate in FIG. 2C, or combinations thereof. The crown region 104 also includes vents 114 coupled to the ducts 122. The crown region 104 further includes one or more sensors 134, such as one or more temperature sensors 135, one or more humidity sensors 136, one or more insulation moisture sensors 138, or a combination thereof. In FIG. 1B, the crown region 104 also includes one or more valves 128 that can be moved between multiple valve positions 130 to route airflow in one or more of the ducts 122 to one or more of the vents 114, 140.

Further, in the example illustrated in FIG. 1B, the lower region 112 includes one or more air conditioning packs 150 coupled, via one or more risers 156, to one or more of the ducts 122. In some implementations, the lower region 112 includes one or more fans 152, such as one or more recirculation fans, that are coupled to the riser(s) 156 via a mixer. In such implementations, the mixer 154 mixes recirculation air and conditioned pack air for distribution via one or more of the ducts 122. In some implementations, the lower region 112 also a heater 153, distinct from the air conditioning pack(s) 150, to heat air used for controlling moisture in the aircraft 100.

In some implementations, the lower region 112 also includes one or more valves 158 that can be moved between multiple valve positions 160 to route airflow. The lower region 112 can also house a control system 162 that is coupled to the valve(s) 128, to the valve(s) 158, or both, and configured to generate signals (e.g., valve actuation signals) to control the positions of one or more of the valves 128, 158 or to control other systems or components illustrated in FIG. 1. In other implementations, the control system 162 is housed in another region of the aircraft 100 or distributed over several regions of the aircraft 100. In still other implementations, the valve(s) 128, the valve(s) 158, or both, are manually controlled, and the control system 162 is omitted or not coupled to the manually controlled valves. The control system 162 includes or corresponds to a special-purpose computing device, a specially-programmed general-purpose computing device, a set of logic and control circuits, a field programmable gate array, an application specific integrated circuit, or another hardware device.

In particular implementations, the air conditioning pack(s) 150 are coupled to the engine(s) 170, to an auxiliary power unit ("APU") 164, or both. In such implementations, the engine(s) 170 or the APU 164 provides compressed air to the air conditioning pack(s) 150, and the air conditioning pack(s) 150 adjust the temperature (and the humidity level) of the compressed air to generate conditioned pack air. For example, the air conditioning pack(s) 150 can include heat exchangers, compression stages, expansion stage, or combinations thereof, to adjust the temperature of the compressed air. Further, in some implementations, compressed air cooled via the air conditioning pack(s) 150 can be mixed with compressed air that has not been cooled to adjust the temperature of the conditioned pack air to a target set point. In some implementations, the compressed air includes or corresponds to bleed air from the engine(s) 170 or the APU 164. In other implementations, the engine(s) 170 or the APU 164 electrically, pneumatically, hydraulically, or mechanically drive a compressor to generate the compressed air.

In some implementations, the aircraft 100 includes a connector 166 that is configured to connect an off-board air source 168 to an environmental control system of the aircraft 100. The off-board air source 168 can supply conditioned air to the aircraft 100 independently of, or in conjunction with, on-board air conditioning system, such as the air conditioning packs 150. For ease of reference herein, the engine(s) 170 and the APU 164 are collectively and individually referred to herein as on-board compressed air sources (such as on-board compressed air sources 165 illustrated in FIGS. 2A-2D). Thus, the term "on-board compressed air source" refers to an engine 170 or an APUs 164, and the plural form of the term (i.e., "on-board compressed air sources") refers to multiple engines 170, or multiple APUs 164, or a group including one or more engines 170 and one or more APUs 164. Further, for ease of reference, the fans 152, and the on-board compressed air sources are referred to herein collectively and individually as on-board air sources 167 to distinguish from the off-board air source 168. Thus, the term "on-board air source" refers to a fan 152, an engine 170, or an APU 164, and the plural form of the term (i.e., "on-board air sources") refers to multiple fans 152, multiple engines 170, or multiple APUs 164, or a group that includes two or more devices selected from fan(s) 152, engine(s) 170, and APU(s) 164.

The aircraft 100 also includes an outflow valve 120, which is illustrated in the lower region 112 in FIG. 1B. The outflow valve 120 is used to control pressure within the aircraft 100. In some implementations, the outflow valve 120 is a passive valve that opens responsive to a pressure differential between inside and outside the aircraft 100. In other implementations, the outflow valve 120 is actively controlled (e.g., via control signals from the control system 162, or is operable actively or passively.

The locations of the various components shown in the crown region 104, the cabin region 108, or the lower region 112 in FIG. 1B are merely illustrative and are not limiting. For example, some of the component shown in the crown region 104, the cabin region 108, or the lower region 112 can extend to other regions of the fuselage 102. To illustrate, one or more of the ducts 122 can include portions within the crown region 104 and portions within the cabin region 108, the lower region 112, or another region. In another example, the crown region 104, the cabin region 108, or the lower region 112 can include additional components in particular implementations, such as implementations described with reference to FIGS. 2A-2D. In yet another example, the one or more of the components shown in the crown region 104, the cabin region 108, or the lower region 112 are optional in some implementations. To illustrate, some or all of the valves 128 can be omitted from the crown region 104 in the implementation described with reference to FIG. 2C.

During operation in a first mode, the control system 162 (or another component) controls the valve positions 130 of the valves 128, the valve positions 160 of the valves 158, the fan(s) 152, the air conditioning pack(s) 150, the heater 153, other components of the aircraft 100, or a combination thereof, to causes the cabin vents 140 to provide conditioned air from the one or more of the ducts 122 to the cabin region 108. The temperature and humidity level of the conditioned air is controlled for passenger/crew comfort or cargo requirements. In a particular implementations, the conditioned air is supplied to an overhead supply duct 124 (shown in FIGS. 2A-2D) via the risers 156 and is typically a mixture of return air from recirculation fan(s) 252 (shown in FIGS. 2A-2D) and fresh conditioned pack air from the air conditioning pack(s) 150. During operation on the ground, the conditioned air can be derived from the off-board air source 168. Thus, the first mode corresponds to typical commercial operation of the aircraft 100 to facilitate passenger or cargo transport.

During operation in a second mode, the control system 162 (or another component) controls the valve positions 130 of the valves 128, the valve positions 160 of the valves 158, the fan(s) 152, the air conditioning pack(s) 150, the heater 153, other components of the aircraft 100, or a combination thereof, to causes drying air vents 116 (shown in FIGS. 2A-2D) to provide drying air to the crown region 104. As described above, in some implementations, the valves 128, 158 can be manually controlled. The drying air is generally warmer and dryer than the conditioned air provided for passenger comfort. For example, in some implementations, the conditioned air for passenger comfort has a temperature in the range of about 18° C. to about 29° C. and a relative humidity in the range of about 10% to about 40%; however, the drying air has temperature of about 32° C. or more and a relative humidity of less than 10% (e.g., 5% or less).

In some implementations, as described further with reference to FIGS. 2A and 2B, the drying air is supplied to the drying air vents 116 from the overhead supply duct 124 via the risers 156. In other implementations, as described further with reference to FIG. 2C, the drying air vents 116 are combined with return air vents 118 (shown in FIG. 2C), and at least a portion of the drying air is supplied to the drying air vents 116 from the return air duct 126. In some implementations, the drying air is supplied to the drying air vents 116 from an air source in another region of the fuselage, such as the cabin region 108 (as described with reference to FIG. 2D), or the lower region 112 (as described with reference to FIGS. 2A-2D).

The first mode of operation is used during typical commercial operation of the aircraft 100 to facilitate passenger or cargo transport; thus, the first mode is also referred to herein as a "normal mode" of operations. The second mode of operation is used during maintenance of the aircraft 100 (e.g., during a drying operation); thus, the second mode is also referred to herein as a "drying mode" of operations.

In some implementations, the control system 162 schedules, suggests (e.g., via information presented via the user interface device 142), or automatically initiates the drying mode of operation based sensor data from the sensors 134. For example, in a particular implementation, the control system 162 determines based on sensor data (e.g., sensor data 202 shown in FIGS. 2A-2D) whether detected moisture satisfies (e.g., is greater than or equal to) a threshold moisture level. In this example, the control system 162 initiates a drying operation, schedules the drying operation, or recommends the drying operation based on a determination that the detected moisture satisfies the threshold moisture level. Alternatively, the control system 162 may only initiate a drying operation in certain conditions, such as when the aircraft 100 is not in flight or when the aircraft 100 is in flight but other conditions are satisfied. To illustrate, the control system 162 may initiate the drying operation when the aircraft 100 is in flight with aircraft occupancy conditions that satisfies occupancy criteria. In this illustrative example, the occupancy criteria are selected to be satisfied when the aircraft occupancy conditions are such that the moisture control system 200 is able to provide drying air without failing to satisfy demand for conditioned air in the cabin region 108. In still other implementations, maintenance personnel manually initiate operation in the drying mode, such as by manually positioning particular valves 128, 158 and supplying drying air from the off-board air source 168.

In some implementations, the first mode and the second mode are mutually exclusive. That is, at any given time, the aircraft 100 can operate in the first mode or the second mode, but not both. However, in other implementations, the first mode and the second mode can be used concurrently or simultaneously. For example, a first air source (e.g., a first air conditioning pack 150A in FIG. 2C) can provide conditioned air to the cabin vents 140 and, at the same time, a second air source (e.g. a second air conditioning pack 150B in FIG. 2C) can provide drying air to the drying air vents 116.

Using the ducts 122 of the aircraft 100 both to route air for the normal mode of operation and to route air for the drying mode of operation enables moisture control, especially in the crown region 104, without the extra weight and space requirements of dedicated drying air ducts and equipment. The control features included in the aircraft 100 to enable this dual use of the ducts 122 are significantly lighter and cheaper than dedicated drying equipment and associated ducting. Accordingly, the weight and cost of aircraft 100 can be less than the weight and cost of a similar aircraft that uses dedicated drying equipment and ducting for moisture control. Further, the disclosed systems and methods can improve operational flexibility of aircraft operators because the disclosed systems are light enough to be cost effective even on routes associated with relatively little condensation.

FIGS. 2A-2D are diagrams that illustrate portions of the aircraft 100 (e.g., the cabin ceiling structure 106, the cabin floor structure 110, the crown region 104, the cabin region 108, and the lower region 112) of FIGS. 1A and 1B and various examples of moisture control systems 200. In FIGS. 2A-2D, various components of the moisture control system 200 are illustrated as blocks. For example, the sensor(s) 134, the insulation 132, the outflow valve 120, the UI device(s) 142, the control system 162, recirculation fan(s) 252, the mixer 154, the air conditioning pack(s) 150, the engine(s) 170, and the off-board air source 168 are illustrated as blocks within respective regions 104, 108, 112 of the aircraft 100 or external to the aircraft 100. In FIGS. 2A-2D, control and communication lines are illustrated using dotted lines. For example, a dotted line connecting the sensor(s) 134 to the control system 162 corresponds to a communication line used to send sensor data 202 from the sensor(s) 134 to the control system 162. Various air flows in FIGS. 2A-2D are illustrate using arrows indicating the general direction of the corresponding airflow. For example, an airflow corresponding to compressed air 222 is illustrated by an arrow pointing from the on-board compressed air sources 165 toward the air conditioning pack(s) 150.

The normal mode of operation is the same for each of the various examples of the moisture control system 200. For example, during the normal mode of operation, one or more of the on-board compressed air sources 165 provides the compressed air 222 to the air conditioning pack(s) 150. Alternatively, the off-board air source 168 can provide conditioned air to the connector 166. The air conditioning pack(s) 150 condition the compressed air 222 to adjust the temperature and humidity of the compressed air 222 to generate conditioned pack air 224. For example, the air conditioning pack(s) 150 can pass the compressed air 222 through various heat exchange, compress, and expansion stages to adjust the temperature and humidity of the compressed air 222. Additionally, in some implementations, raw compressed air 222 (e.g., bleed air) can be mixed with the conditioned pack air 224 to further regulate the temperature of the conditioned pack air 224.

The conditioned pack air 224 is generally mixed, in the mixer 154, with recirculation air 214 from the recirculation fan(s) 252. The recirculation air 214 is derived from the crown region 104, the lower region 112, and/or the cabin region 108. If the off-board air source 168 is used rather than the air conditioning pack(s) 150, the off-board air source 168 provides conditioned air (not shown) to the mixer 154 via the connector 166. In some implementations, the off-board air source 168 is connected to the mixer 154 via one or more of the air conditioning pack(s) 150. For example, the connector 166 can connect the off-board air source 168 to the air conditioning pack(s) 150 such that the air conditioning pack(s) 150 route conditioned air from the off-board air source 168 to the mixer 154.

The mixer 154 provides mixed air 216 via one or more risers 156 to the overhead supply duct 124. The control system 162 controls the air conditioning pack(s) 150, the recirculation fan(s) 252, the heater 153, the off-board air source 168, other components, or a combination thereof, to adjust characteristics of the mixed air 216. For example, the control system 162 can control the airflow rate from the recirculation fan(s) 252, the airflow rate from air conditioning pack(s) 150, or both, to adjust a mixing ratio to control how much fresh air (e.g., conditioned pack air 224) is in the mixed air 216. In this example, the conditioned pack air 224 generally has a different temperature than the recirculation air 214, thus controlling the mixing ratio can be used to control the temperature of the mixed air 216. Additionally, the conditioned pack air 224 generally has a lower moisture content (corresponding to a lower dew point) than recirculation air 214; thus, controlling the mixing ratio can be used to control the moisture content of the mixed air 216.

Airflow 210 within the overhead supply duct 124 is routed, in the normal mode of operation, to cabin vents 140 and output via the cabin vents 140 as conditioned air 212 into the cabin region 108. Although the cabin region 108 is separated from the crown region 104 by the cabin ceiling structure 106, the cabin ceiling structure 106 is not airtight and allows airflow from the cabin region 108 to enter the crown region 104 in order to facilitate air circulation within the cabin region 108. The outflow valve 120 can vent some air (labeled outflow air 208 in FIGS. 2A-2D) to control the pressure within the fuselage (e.g., to offset pressure increase due to the addition of the compressed air 222 into the fuselage) or for other purposes, such as to remove waste air 207 from circulation in the fuselage. Although the outflow valve 120 is illustrated in the lower region 112, in other implementations the outflow valve 120 is disposed in the crown region 104, or another portion of the fuselage 102. Further, in some implementations, the aircraft 100 includes multiple outflow valves 120, such as one or more outflow valves 120 disposed in the crown region 104 and one or more outflow valves 120 disposed in the lower region 112.

Figure 2D:
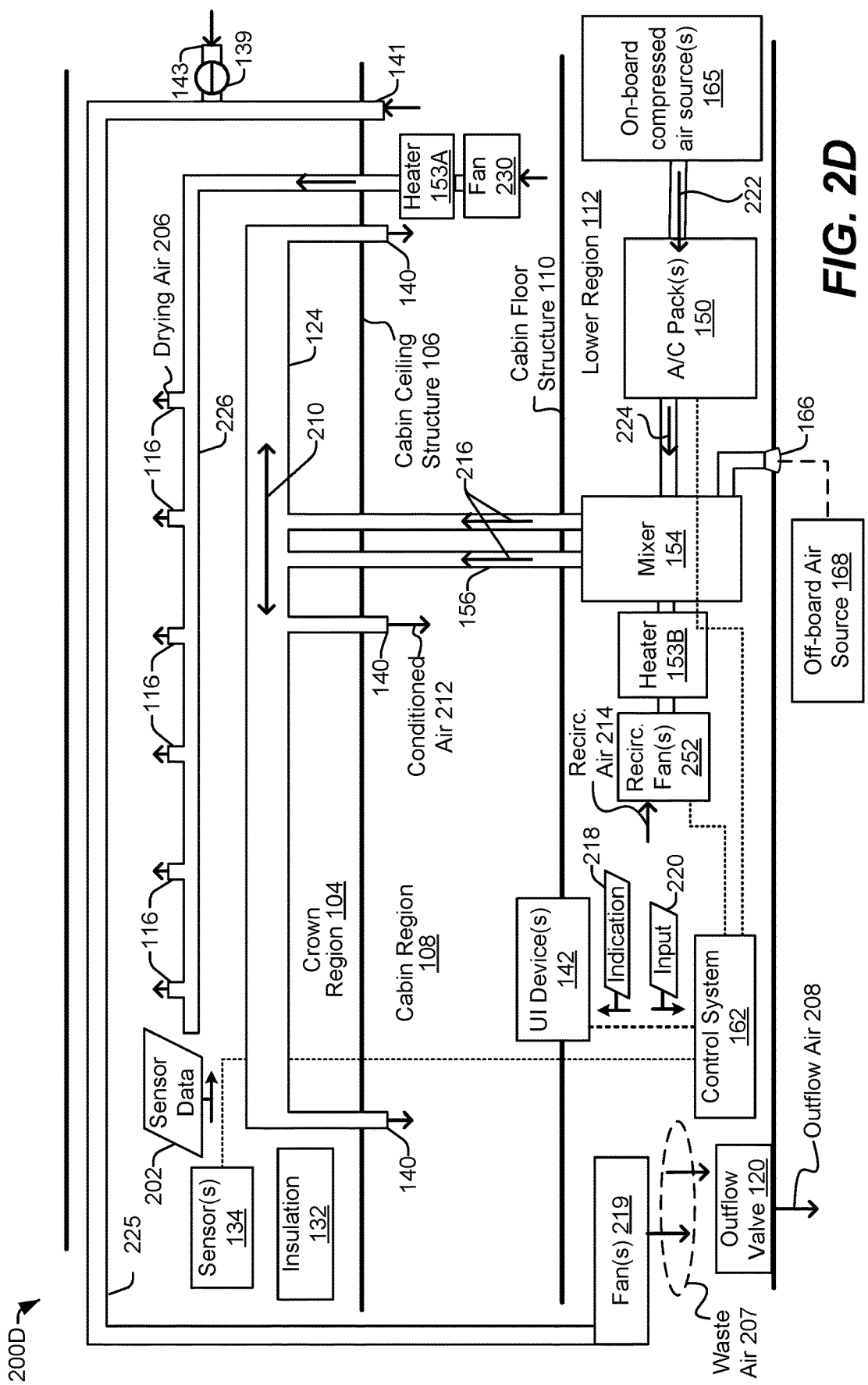
FIG. 2D is a diagram that illustrates a portion of the aircraft of FIGS. 1A and 1B and a fourth example of the moisture control system of FIG. 1B.

In some implementations (e.g., as illustrated in FIG. 2C), return air vents 118 capture a portion of the recirculation air 214 from the crown region 104 and direct the recirculation air 214 from the crown region 104 via a return air duct 126 to the recirculation fan(s) 252. In other implementations (e.g., as illustrated in FIGS. 2A, 2B and 2D), the recirculation air 214 circulates to the recirculation fan(s) 252 as a result of airflow patterns within the aircraft 100. Although the return air vents 118 are illustrated in FIG. 2C as disposed the crown region 104, in other implementations return air vents 118 are disposed in the lower region 112, or the aircraft 100 includes one or more return air vents 118 disposed in the crown region 104 and one or more return air vents 118 disposed in the lower region 112.

In some implementations, the moisture control system 200 includes air extraction system, such as a lavatory and galley ventilation system (LGVS), that routes waste air 207 to the outflow valve 120. For example, in FIGS. 2A-2D, the moisture control system 200 includes one or more fans 219 (e.g., a LGVS fan) coupled to a ventilation duct 225. The ventilation duct 225 is coupled to one or more extraction vents 141 in cabin region 108. In this example, the one or more extraction vents 141 are positioned in lavatory areas, galley areas, or other areas within the cabin region 108 in which a relatively large (as compared to other areas in the cabin region 108) air turnover rate is desired for odor control or for other purposes.

The sensor(s) 134 are configured to generate sensor data 202 indicating moisture content of the insulation 132, moisture content of sampled air (e.g., air within the crown region 104), temperature, or a combination thereof. For example, the sensor(s) 134 can include temperature sensors, humidity sensors, insulation moisture content sensors, or a combination thereof. Additionally, although the sensor(s) 134 are illustrated as disposed in the crown region 104, in some implementations, the aircraft 100 can include additional sensor 134 disposed in other areas, such as behind equipment panels in the cockpit region 180 or the aft region 182, in the cabin region 108, or in the lower region 112.

In some implementations, the control system 162 uses the sensor data 202 to determine whether a drying operation should be performed, when a drying operation is complete, or both. For example, the control system 162 can determine that a drying operation should be performed if the sensor data 202 indicates that a sensed humidity value is greater than a humidity threshold value or if the sensor data 202 indicates that a sensed moisture content value of the insulation 132 is greater than an insulation moisture content threshold value. In response to determining that a drying operation should be performed, the control system 162 can send an indication 218 to one or more of the user interface (UI) devices 142. The UI device(s) 142 can be disposed in various regions of the aircraft. In some implementations, the UI devices 142 include a cockpit device, such as a display, a light, or a dial that provides a visual summary of aircraft information. Additionally or in the alternative, in some implementations, the UI devices 142 include a maintenance device, such as a display, a light, or a dial that provides a visual summary of aircraft information for maintenance personnel. The indication 218 can instruct personnel to schedule or initiate the drying operation or can notify personnel that the control system 162 has automatically scheduled or initiated the drying operation. A user can provide input 220 to the control system 162 to approve a scheduled drying operation, to modify (e.g., reschedule) a scheduled drying operation, to initiate a drying operation, or to override (e.g., cancel) an automatically initiated drying operation.

When the drying operation is initiated (e.g., by the control system 162 or by a user), the control system 162 controls operation of various components to provide drying air 206 to drying air vents 116. In some implementations, the control system 162 also controls operation one or more air sources to generate the drying air 206. For example, the control system 162 can cause the air conditioning pack(s) 150 to output conditioned pack air 224 that is warmer and/or dryer than conditioned pack air 224 output during operation in the normal mode. As another example, the control system 162 can cause the heater 153 to heat air extracted from another region of the aircraft (e.g., a region other than the crown region 104) to generate the drying air 206.

In some implementations, the control system 162 can also active the air extraction system to remove waste air 207 from the crown region 104 during drying operation. For example, as illustrated in FIGS. 2A-2D, the air extraction system can include one or more extraction vents 143 coupled to the ventilation duct 225, and one or more valves 139 are coupled between the ventilation duct 225 and the extraction vent(s) 143. Before, during, or after initiating the drying operation, the control system 162 can send the valve actuation signals 204 to the one or more valves 139 to enable air from the crown region 104 to be drawn into the ventilation duct 225 via the extraction vent(s) 143. The control system 162 also activates the fan 219 if the fan 219 is not already active.

In the specific example illustrated in FIG. 2A, the moisture control system 200A uses the overhead supply duct 124 to supply the drying air 206 to the drying air vents 116. In this example, the control system 162 sends one or more valve actuation signals 204 to the valves 128. In a first valve position, the valves 128 block airflow 210 in the overhead supply duct 124 from exiting via the drying air vents 116, and in a second valve position, the valves 128 allow the airflow 210 in the overhead supply duct 124 to exiting via the drying air vents 116. The valves 128 may also be positionable to an intermediate position between the first valve position and the second valve position. In FIG. 2A, to initiate a drying operation, the valve actuation signals 204 instruct the valves 128 to move to the second valve position (illustrated in FIG. 2A) to allow the airflow 210 to exit via the drying air vents 116 as the drying air 206.

The drying air 206 includes the conditioned pack air 224, air from the off-board air source 168, the recirculation air 214, or various combinations thereof. For example, when one of the on-board compressed air sources 165 is used, the drying air 206 includes the conditioned pack air 224 or a mixture of the conditioned pack air 224 and the recirculation air 214. An another example, when the off-board air source 168 is used, the drying air 206 includes air from the off-board air source 168 or a mixture of the air from the off-board air source 168 and the recirculation air 214. In yet another example, if another source of air is available (e.g., an open door in the fuselage), the recirculation fan(s) 252 and the heater 153 can generate the drying air 206 from the recirculation air 214. Further, the heater 153 can be used to heat the recirculation air 214 before the recirculation air 214 is mixed with air from the off-board air source 168 or with the conditioned pack air 224.

In some implementations, the control system 162 can also cause the outflow valve 120 to open to vent outflow air 208 from the aircraft 100. Alternatively, the outflow valve 120 can open due to pressure within the aircraft 100. For example, the control system 162 can open the valve 139 to allow air in the crown region 104 to enter the ventilation duct 225 and activate the fan(s) 219 to move the waste air 207 toward the outflow valve 120. In any of the situations, the drying air 206 removes moisture from the crown region 104 and insulation (e.g., by evaporating condensed moisture), and entrains the moisture in the outflow air 208.

In the moisture control system 200A illustrated in FIG. 2A, the drying air vents 116 are directly coupled to the overhead supply duct 124, or coupled to short ducts that direct the drying air 206 in particular directions. In contrast, in a moisture control system 200B in FIG. 2B, a drying air manifold 226 is coupled to the overhead supply duct 124, and the drying air vents 116 are coupled to the drying air manifold 226; otherwise, the moisture control system 200B operates in the same manner as the moisture control system 200A. Although the moisture control system 200B is illustrated as including two valves 128 and the drying air manifold 226 is coupled to the overhead supply duct 124 in two locations, in other implementations, the moisture control system 200B includes more than or fewer than two valves 128 and the drying air manifold 226 is coupled to the overhead supply duct 124 in more than or fewer than two locations. To illustrate, in a particular implementation, the moisture control system 200B includes one valve 128, and the drying air manifold 226 is coupled to the overhead supply duct 124 in one location. In this implementation, the total cost and weight of the single valve 128 of the moisture control system 200B is less than the total cost and weight of the multiple valves 128 in the moisture control system 200A of FIG. 2A, although the drying air manifold adds extra weight and cost that is absent from the moisture control system 200A. Thus, the moisture control system 200B may be preferred if the weight and/or cost of the drying air manifold 226 is less than the weight and/or cost of the additional valves 128 in the moisture control system 200A.

FIG. 2C is a diagram that illustrates a third example of a moisture control system 200C. In contrast to the moisture control system 200A of FIG. 2A and the moisture control system 200B of FIG. 2B, the moisture control system 200C distributes at least a portion of the drying air 206 via drying air/return air vents 116/118 coupled to the return air duct 126. For example, the moisture control system 200C includes the valves 158 in the lower region 112, including a first valve 158A, a second valve 158B, and a third valve 158C. In this example, during operation in the normal mode, the valves 158 are positioned in respective first valve positions, and during operation in the drying mode, the valves 158 are positioned in respective second valve positions. FIG. 2C illustrates the valves 158 in the second valve position.

In the first valve position, the first valve 158A enables recirculation air 214 to be provided from the return air duct 126 to the recirculation fan(s) 252 and the mixer 154. Also, in the first valve, the third valve 158C enables the conditioned pack air 224 from the air conditioning pack(s) 150 (e.g., from a second air conditioning pack 150B in the example illustrated in FIG. 2C) to be provided to the mixer 154. Further, in the first valve position, the second valve 158B is closed to block or inhibit the conditioned pack air 224 from the air conditioning pack(s) 150 from passing through ducting to the first valve 158A. Thus, in the normal mode, the valves 158 are in respective first positions to provide the mixed air 216, including the recirculation air 214 and the conditioned pack air 224, to the overhead supply duct 124 as described with reference to FIG. 2A.

In the second valve position, the third valve 158C blocks the conditioned pack air 224 output by the air conditioning pack(s) 150 (e.g., the second air conditioning pack 150B) from entering the mixer 154. Also, in the second valve position, the second valve 158B is open to allow the conditioned pack air 224 to pass through ducting to the first valve 158A. Further, in the second valve position, the first valve 158A allows the conditioned pack air 224 to be provided to the return air duct 126 which passes the conditioned pack air 224, as the drying air 206, to the crown region 104. Thus, in the drying mode, the valves 158 are in respective second positions to provide the conditioned pack air 224, as the drying air 206, to the drying air/return air vents 116/118.

Generally, the lower region 112 of the aircraft 100 is less crowded than the crown region 104. Accordingly, design and installation of the valves 158, which are disposed in the lower region 112, should be simpler and less expensive than designing and installing the valves 128 in the crown region 104. Further, it is generally faster and easier for maintenance personnel to access components in the lower region 112 than to access components in the crown region 104. Accordingly, it should be easier and cheaper to maintain the valves 158 in the lower region 112 than to maintain the valves 128 in the crown region 104.

In some implementations, the moisture control system 200C can also include equipment to distribute drying air via the overhead supply duct 124. For example, in FIG. 2C, the valves 128 and drying air vents 116 are coupled to the overhead supply duct 124 and can be opened to supply drying air 206 in the crown region 104. Such implementations provide more flexibility in directing the drying air 206 to targeted locations, such as to particular portion of the insulation 132 that are detected to have higher moisture content than other portions of the insulation 132. For example, the drying air/return air vents 116/118 can be located at particular positions based on airflow patterns desired in the cabin region 108. In this example, the drying air/return air vents 116/118 may not be positioned near some insulation blankets or other portions of the insulation 132 that are subject to significant moisture build up. In this example, the drying air vents 116 coupled to the overhead supply duct 124 can be used to provide the drying air 206 to areas distant from or otherwise not accessible to the drying air/return air vents 116/118 coupled to the return air duct 126. Although FIG. 2C illustrates the drying air vents 116 as attached to the overhead supply duct 124 (e.g., similar to the example illustrated in FIG. 2A), the drying air vents 116 can also, or in the alternative, be coupled to a drying air manifold (e.g., the drying air manifold 226 illustrated in FIG. 2B) that is coupled to the overhead supply duct 124. The moisture control system 200C of FIG. 2C also includes other features described with reference to FIG. 2A, such as the heater 153 and the air extraction system, which can be used as described with reference to FIG. 2A to facilitate moisture control in the crown region 104.

In some implementations, such as illustrated in FIG. 2C, the moisture control system 200C can include more than one air conditioning pack 150 and components to enable the moisture control system 200C to operate in the normal mode concurrently with operating in the drying mode. For example, the first air conditioning pack 150A can supply conditioned pack air 224 to the mixer 154 to be provided to the cabin region 108 as conditioned air 212, and at the same time, the second air conditioning pack 150B can supply conditioned pack air 224 to the return air duct 126 to be provided to the crown region 104 as drying air 206. Note that the APU 164 is not illustrated in FIG. 2C due to space constraints associated with showing multiple air conditioning packs 150; however, it should be understood that the moisture control system 200C can include the APU 164, which can provide pack air 224 to one or more of the air conditioning packs 150.

Although FIG. 2C illustrates valves 158 associated with the second air conditioning pack 150B, in other implementations, the valves 158 are associated with the first air conditioning pack 150A, or the valves 158 are associated with both the first and second air conditioning packs 150A and 150B. Further, in some implementations, the aircraft 100 includes multiple recirculation fans 252 and multiple return air ducts 126. In such implementations, one or more return air ducts 126 can provide recirculation air 214 to a respective recirculation fan 252 at the same time that one or more other return air ducts 126 are being used to supply drying air 206.

FIG. 2D is a diagram that illustrates a fourth example of a moisture control system 200D. In contrast to the moisture control systems 200A, 200B, and 200C of FIGS. 2A-2C, the moisture control system 200D uses one or more of the fans 152 of FIG. 1B to provide the drying air 206 from a region of the fuselage other than the crown region 104. For example, in FIG. 2D, a fan 230 are examples of instances of the fan(s) 152 of FIG. 1B. In this example, the fan 230 and a heater 153A are disposed to extract air from the cabin region 108 and to route the air via a drying air manifold 226 to the crown region 104 as the drying air.

In some implementations, the fan 230 is a dual-purpose fan. For example, the fan 230 can be configured to function as an overhead recirculation fan for cabin air recirculation when the fan 230 is not operating in a drying mode. In such implementations, the fan 230 does not add any weight burden to the aircraft 100. During operation in the drying mode, the fan 230 moves dry air from the cabin region 108 into the crown region 104. This ventilation is effective and efficient at reducing moisture levels in the crown region 104, and in some implementations, entails fewer changes to the control system 162 than the moisture control systems 200A, 200B, and 200C. Further, if the cabin region 108 is warm and dry, such as when a cabin door is left open in at a warm, dry location, such as Phoenix, Arizona, the moisture control system 200D is more energy efficient than operating the air conditioning packs 150 or off-board air source 168 to provide the drying air 206.

In some implementation, the aircraft 100 includes features or components of two or more of the moisture control systems 200A-D. For example, the aircraft 100 can include the fan 230 of FIG. 2D as well as one of the other moisture control systems 200A-C. In such implementations, the fan 230 can be used for moisture control when the cabin region 108 is warm and dry, and the air conditioning packs 150 or off-board air source 168 can be used to supply the drying air 206 under other circumstances.

Figure 3:
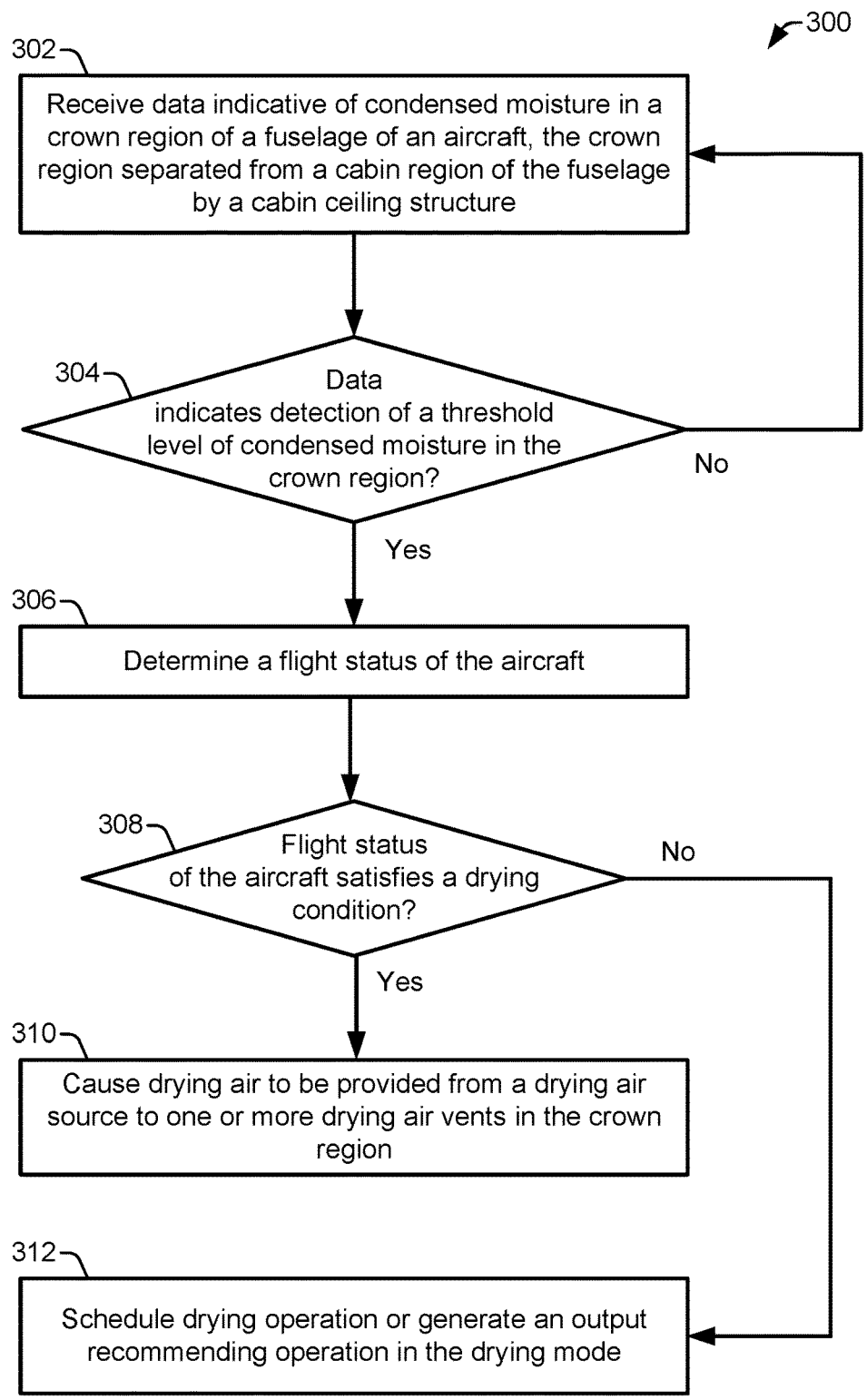
FIG. 3 is a diagram that illustrates a flow chart of an example of method of controlling moisture on board an aircraft.

FIG. 3 is a diagram that illustrates a flow chart of an example of a method 300 of controlling moisture on board an aircraft. In a particular implementation, the control system 162 of any of FIG. 1B, 2A, 2B, 2C, or 2D initiates or performs the method 300, or controls the operation of one or more components of the moisture control system 200 to perform the method 300.

The method 300 includes, at 302, receiving data indicative of condensed moisture in a crown region of a fuselage of an aircraft, where the crown region is separated from a cabin region of the fuselage by a cabin ceiling structure. As a first example, the sensors 134 send the sensor data 202 to the control system 162. The sensor data 202 includes an indication of the humidity in the crown region 104, an indication of condensed moisture content of the insulation 132, another indication of condensed moisture in the crown region 104, or a combination thereof. In a second example, an aircraft crew member reports an observation indication of condensed moisture in the aircraft, or specifically or condensed moisture in the crown region 104.

The method 300 also includes, at 304, determining whether the data indicates detection of a threshold level of condensed moisture in the crown region. Responsive to a determination, at 304, that the data does not indicate detection of at least the threshold level of condensed moisture in the crown region, the method 300 returns to 302 and continues to monitor condensed moisture conditions in the crown region.

Responsive to a determination, at 304, that the data indicates detection of at least the threshold level of condensed moisture in the crown region, the method 300 includes, at 306, determining a flight status of the aircraft. For example, the flight status of the aircraft can be determined based on user input via the user interface device 142, based on other sensors of the aircraft, based on a signal from a flight control computer or another line replaceable unit that is configured to output flight or phase of flight data, or a combination thereof.

The method 300 also includes, at 308, determining whether the flight status satisfies a drying condition. In a particular implementation, the flight status satisfies the drying condition when the aircraft is not in flight or when the aircraft is in flight with an aircraft occupancy condition that satisfies occupancy criteria. The occupancy condition is selected to ensure that supplying the drying air 206 to the crown region 104 does not prevent the moisture control system 200 from suppling sufficient conditioned air 212 to the cabin region 108 based on the number and distribution of passengers and crew on the aircraft 100. For example, a particular airflow rate (or duct pressure) may be needed at various portions of the cabin region 108 to ensure passenger comfort based on the number and distribution of passengers within the cabin region 108. In this example, the aircraft occupancy condition satisfies the occupancy criteria if the number of passengers within the cabin region 108 is below a threshold, which is set to enable the moisture control system 200 to supply sufficient conditioned air 212 to the cabin region 108 while simultaneously (or sequentially) providing the drying air 206 to the crown region 104. Alternatively in this example, the aircraft occupancy condition satisfies the occupancy criteria if the passengers within the cabin region 108 are clustered in a particular portion (e.g., a zone) in the cabin region 108 such that the moisture control system 200 is able to supply sufficient conditioned air 212 to the particular portion of the cabin region 108 while simultaneously (or sequentially) providing the drying air 206 to the crown region 104.

Responsive to a determination, at 308, that the flight status of the aircraft satisfies the drying condition, the method 300 includes, at 310, causing drying air to be provided from a drying air source to one or more drying air vents in the crown region. For example, the control system 162 can send the valve actuation signals 204 to the valves 128, to the valves 158, or to both, to cause one or more of the valves 128, 158 to move to a valve position associated with directing the drying air 206 into the crown region 104. Additionally or in the alternative, the control system 162 can send other signals to other components of the moisture control system 200 to cause the moisture control system 200 or portions of the moisture control system 200 to operation in the drying mode of operation.

Responsive to a determination, at 308, that the flight status of the aircraft fails to satisfy the drying condition, the method 300 includes, at 312, scheduling a drying operation, generating an output recommending operation in the drying mode, or both. For example, the control system 162 can send the indication 218 to the user interface device(s) 142 to notify a user that the drying operation is scheduled or to notify the user that operation in the drying mode is recommended. Alternatively, in some implementations, rather than scheduling a drying operation, the method 300 may continue to monitor condensed moisture in the crown region and the flight status of the aircraft and initiate a drying operation when the condensed moisture in the crown region and the flight status both indicate that a drying operation should be performed. For example, responsive to a determination, at 308, that the flight status of the aircraft fails to satisfy the drying condition, the method 300 may return to block 302.

Although FIG. 3 illustrates an automated or semi-automated method of controlling the moisture control system 200, in some implementations, the moisture control system 200 can also, or in the alternative, be manually controlled. For example, the sensors 134 of FIGS. 1-2D can be used to generate the indication 218 to initiate or schedule a drying operation. In this example, personnel associated with the aircraft 100 can initiate the drying operation at an opportune time, such as when the aircraft 100 is on the ground and not scheduled for flight for a period of time sufficient to perform drying. As another example, personnel associated with the aircraft 100 can initiate a drying operation at an opportune time independent of any indication 218 to initiate or schedule a drying operation. To illustrated, if aircrew observe condensed moisture during a flight, the aircrew may initiate a drying operation even if the control system 162 does not provides an indication 218 to do so.

Figure 4:
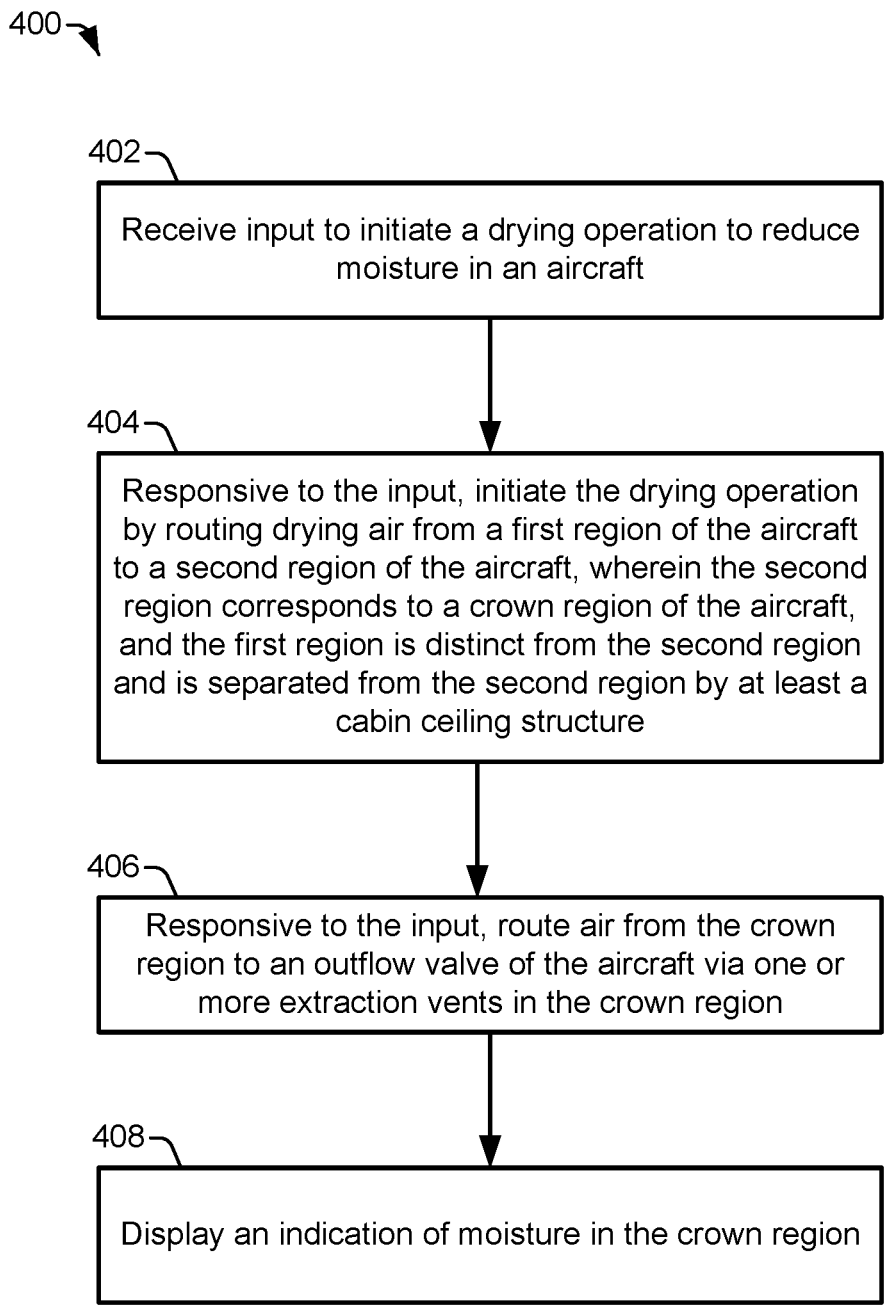
FIG. 4 is a diagram that illustrates a flow chart of an example of another method of controlling moisture on board an aircraft.

FIG. 4 is a diagram that illustrates a flow chart of an example method of controlling moisture on board an aircraft. In a particular implementation, any of the moisture control systems 200 of FIG. 2A, 2B, 2C, or 2D or systems described with reference to FIG. 1B performs the method 400.

In the example illustrated in FIG. 4, the method 400 includes, at 402, receiving input to initiate a drying operation to reduce moisture in an aircraft. For example, a user (e.g., a member of the flight crew or ground crew for the aircraft) can provide user input to the control system 162 via the UI device(s) 142 to initiate the drying operation. As another example, the sensor(s) 134 can provide the sensor data 202 to the control system 162 to initiate the drying operation. In other examples, the control system 162 can initiate the drying operation based on input received from a scheduling device (not shown) or other source.

The method 400 also includes, at 404, responsive to the input, initiating the drying operation by routing drying air from a first region of the aircraft to a second region of the aircraft. In the method 400, the second region corresponds to the crown region 104 of the aircraft, and the first region is distinct from the second region and is separated from the second region by at least a cabin ceiling structure. For example, the first region can include or correspond to the cabin region 108, the lower region 112, or another region within the fuselage 102.

In some implementations, initiating the drying operation includes actuating one or more valves coupled to a duct in the crown region. In such implementations, the one or more valves are configured to, in a first valve position, route airflow within the duct to one or more drying air vents in the crown region and configured to, in a second valve position, route the airflow within the duct to cabin vents in a cabin region of the aircraft. For example, initiating the drying operation can include sending the valve actuations signal(s) 204 to the valves 128 as described with reference to FIGS. 2A and 2B. In this example, initiating the drying operation may also include sending the valve actuations signal(s) 204 to the valve 139.

In some implementations, initiating the drying operation includes actuating one or more valves coupled to a duct. In such implementations, the duct is coupled to one or more vents in the crown region, and the valve(s) are configured to, during operation in a first mode, route recirculation air to a recirculation fan via the duct and during operation in a second mode, route the drying air to the crown region via the duct. For example, initiating the drying operation can include sending the valve actuations signal(s) 204 to the valves 158 as described with reference to FIG. 2C. In some of these implementations, initiating the drying operation can include sending the valve actuations signal(s) 204 to the valves 128 of FIG. 2C. In a particular implementation, initiating the drying operation also includes sending the valve actuations signal(s) 204 to the valve 139.

In some implementations, initiating the drying operation includes activating a fan to move air from the first region of the aircraft to the crown region and activating a heater to heat the air from the first region to generate the drying air. For example, initiating the drying operation can include activating the fan 230 and the heater 153A of FIG. 2D. Additionally, or in the alternative, initiating the drying operation can include activating the recirculation fan(s) 252 and the heater 153B of FIG. 2D, or the recirculation fan(s) 252 and the heater 153 of any of FIG. 2A, 2B, or 2C.

The method 400 also includes, at 406, responsive to the input, routing air from the crown region to an outflow valve of the aircraft via one or more extraction vents in the crown region. For example, air within the crown region 104 can circulate through the fuselage 102 to the lower region 112 (or to another region that includes an outflow valve 120) and exit the fuselage 102 via the outflow valve 120 as outflow air 208. In some implementations, the air can be routed to the outflow valve 120 via a ventilation system, as illustrated in FIGS. 2A-2D. For example, the valve 139 can be opened to allow air from the crown region 104 to enter the ventilation duct 225 via the extraction vent(s) 143. In this example, the fan(s) 219 can provide (or enhance) a pressure differential to drive the waste air 207 from the ventilation duct 225 toward the outflow valve 120.

In the example illustrated in FIG. 4, the method 400 also includes, at 408, displaying an indication of moisture in the crown region. For example, the control system 162 or the sensor(s) 134 can provide information indicating moisture in the crown region to the UI device(s) 142. In this example, the UI device(s) 142 can display the information to assist a user with determining when to initiate a drying operation (e.g., by providing the input received at block 402) or when to terminate a drying operation.

Figure 5:
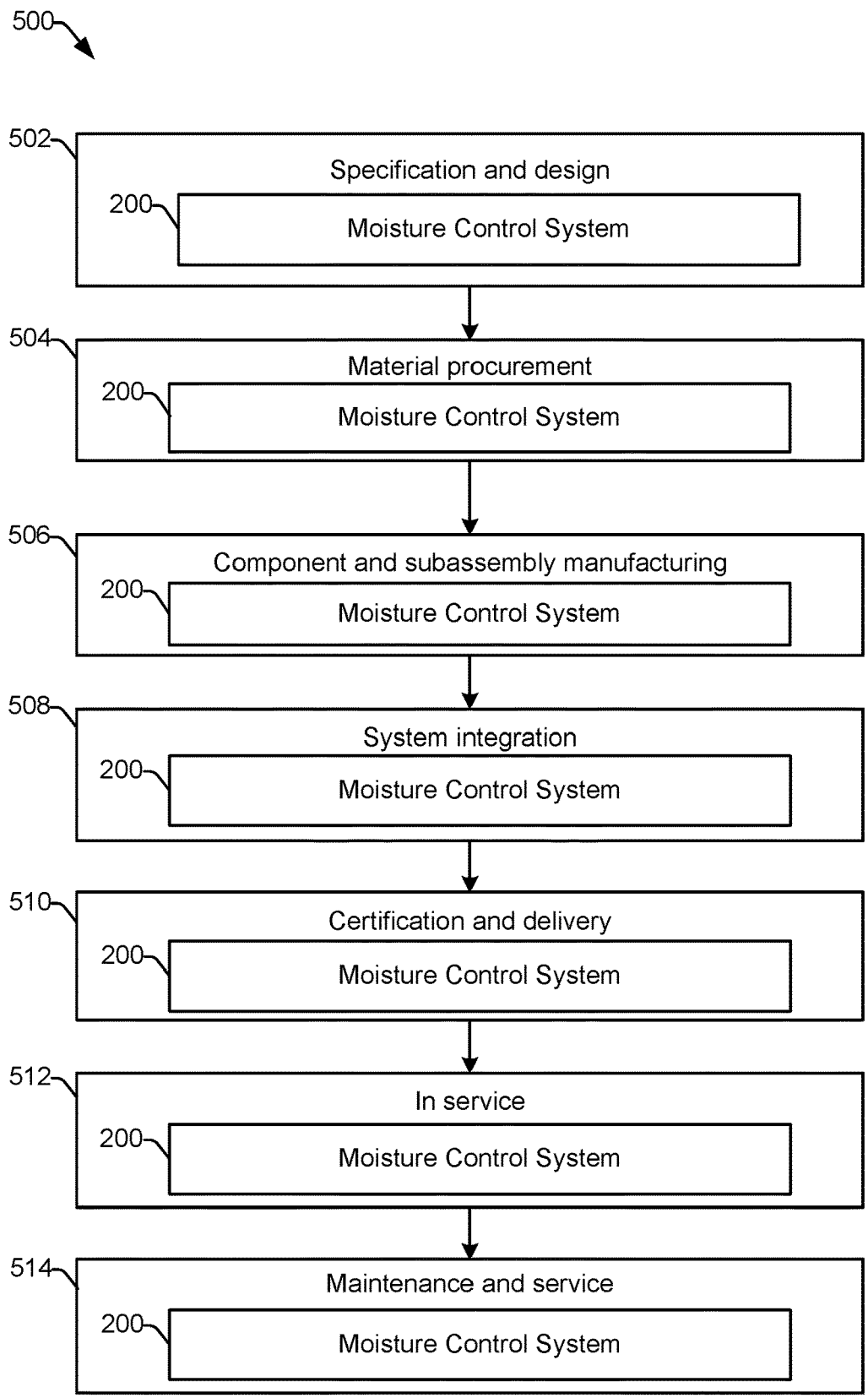
FIG. 5 is a diagram that illustrates a flow chart of an example of a life cycle of an aircraft that includes a moisture control system.

FIG. 5 is a flowchart illustrating a life cycle 500 of an aircraft (e.g., the aircraft 100 of FIGS. 1A and 1B) that includes the moisture control system 200. During pre-production, the exemplary life cycle 500 includes, at 502, specification and design of the aircraft 100. During specification and design of the aircraft 100, the life cycle 500 may include specification and design of the moisture control system 200 or one or more components of the moisture control system 200. At 504, the life cycle 500 includes material procurement, which may include procuring materials for the moisture control system 200.

During production, the life cycle 500 includes, at 506, component and subassembly manufacturing and, at 508, system integration of the aircraft 100. For example, the life cycle 500 may include component and subassembly manufacturing of the moisture control system 200 and system integration of the moisture control system 200. At 510, the life cycle 500 includes certification and delivery of the aircraft 100 and, at 512, placing the aircraft 100 in service. Certification and delivery may include certification of the moisture control system 200 to place the moisture control system 200 in service. While in service by a customer, the aircraft 100 may be scheduled for routine maintenance and service (which may also include modification, reconfiguration, refurbishment, and so on). At 514, the life cycle 500 includes performing maintenance and service on the aircraft, which may include performing maintenance and service on the moisture control system 200 or reconfiguring an environmental control system of the aircraft 100 to add components of the moisture control system 200.

Each of the processes of the life cycle 500 is performed or carried out by a system integrator, a third party, and/or an operator (e.g., a customer). For the purposes of this description, a system integrator includes without limitation any number of aircraft manufacturers and major-system subcontractors; a third party includes without limitation any number of venders, subcontractors, and suppliers; and an operator includes an airline, a leasing company, a military entity, a service organization, and so on.

Figure 6:
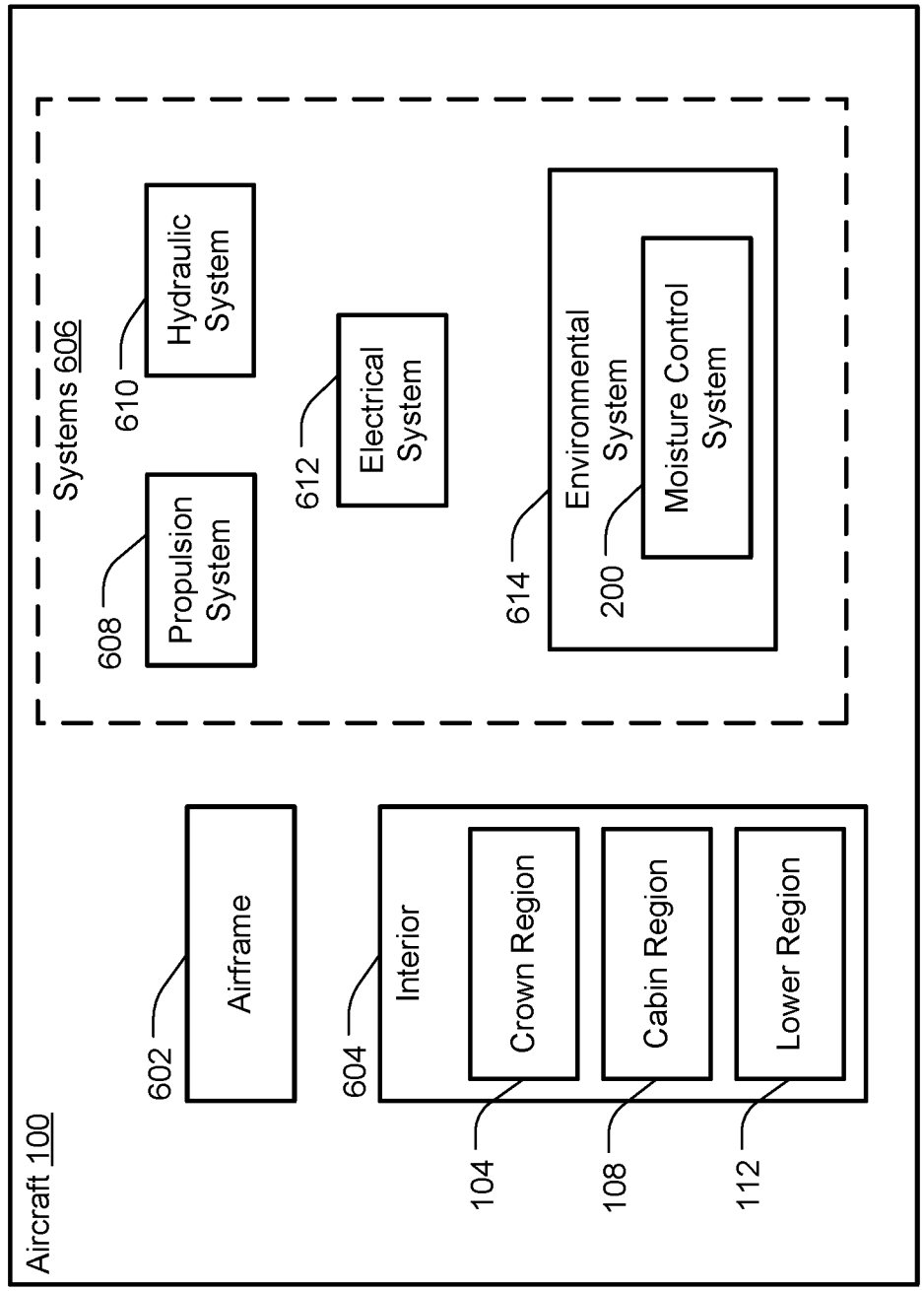
FIG. 6 is a block diagram of an aircraft that includes a moisture control system.

FIG. 6 is a block diagram of the aircraft 100 that includes the moisture control system 200 and other components. In the example of FIG. 6, the aircraft 100 includes an airframe 602 with a plurality of systems 606 and an interior 604. The interior 604 includes the crown region 104, the cabin region 108, and the lower region 112. Examples of the plurality of systems 606 include one or more of a propulsion system 608 (which can include the engine(s) 170 of FIGS. 1A-2D), a hydraulic system 610, an electrical system 612, an environmental system 614. The environmental system 614 includes, is included within, or corresponds to the moisture control system 200, which can include or correspond to the moisture control system 200A of FIG. 2A, the moisture control system 200B of FIG. 2B, the moisture control system 200C of FIG. 2C, the moisture control system 200D of FIG. 2D, or a combination thereof. The aircraft 100 can also include additional systems or subsystems that are not shown.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
    a fuselage defining a cabin region and a crown region, the crown region separated from the cabin region by a cabin ceiling structure;
    a mixer configured to generate a mixed airflow;
    a duct disposed within the crown region, wherein the duct receives the mixed airflow;
    one or more drying air vents in the crown region and coupled to the duct, the one or more drying air vents configured to receive a first portion of the mixed airflow from the duct;
    one or more cabin vents disposed within the cabin region and coupled to the duct, the one or more cabin vents configured to receive a second portion of the mixed airflow from the duct; and
    one or more valves coupled to the duct and configured to, in a first valve position, route the first portion of the mixed airflow within the duct through the one or more drying air vents into the crown region and the second portion of the mixed airflow through the one or more cabin vents into the cabin region, and configured to, in a second valve position, route the second portion of the mixed airflow within the duct through the one or more cabin vents into the cabin region and prevent routing the first portion of the mixed airflow through the one or more drying air vents into the crown region.

2. The aircraft of claim 1, further comprising a control system within the fuselage and coupled to the one or more valves, wherein the control system is configured to send valve actuation signals to the one or more valves to control valve positions of the one or more valves.

3. The aircraft of claim 2, further comprising one or more sensors disposed in the crown region and coupled to the control system, the one or more sensors configured to provide sensor data to the control system, the sensor data indicative of moisture in the crown region.

4. The aircraft of claim 3, wherein the one or more sensors include a temperature sensor, a humidity sensor, an insulation moisture sensor, or a combination thereof.

5. The aircraft of claim 3, further comprising a user interface device coupled to the control system, wherein the control system is further configured to, based on the sensor data, send to the user interface device an indication to initiate or schedule a drying operation.

6. The aircraft of claim 2, wherein the one or more valves are disposed in the crown region and the duct is an overhead supply duct.

7. The aircraft of claim 2, wherein the control system is further configured to control one or more of a temperature of the mixed airflow, a humidity level of the mixed airflow, or a flow rate of the mixed airflow, based on aircraft occupancy conditions, flight status of the aircraft, or both.

8. The aircraft of claim 2, wherein the control system is further configured to control one or more of a temperature of the mixed airflow, a humidity level of the mixed airflow, or a flow rate of the mixed airflow based on input received via a user interface device.

9. The aircraft of claim 1, further comprising one or more air conditioning packs configured to generate at least a portion of the mixed airflow provided to the duct using compressed air from one or more on-board compressed air sources.

10. The aircraft of claim 9, further comprising one or more recirculation fans coupled to the mixer, wherein the mixer is coupled to the duct via one or more risers, wherein the fuselage further defines a lower region separated from the cabin region by a cabin floor structure and wherein the one or more risers connect to the mixer in the lower region.

11. The aircraft of claim 1, further comprising one or more recirculation fans coupled to the mixer, and a heater coupled to the mixer, wherein the heater is configured to adjust a temperature of recirculation air from the one or more recirculation fans to generate at least a portion of the mixed airflow.

12. The aircraft of claim 1, further comprising a connector configured to connect to an off-board air source to receive airflow during operation in a drying mode.

13. The aircraft of claim 1, wherein the one or more valves are further configured to, in the first valve position, route a portion of the mixed airflow out of the crown region through one or more extraction vents.

14. The aircraft of claim 1, further comprising an outflow valve configured to discharge outflow air from the aircraft and one or more fans coupled to a ventilation duct, the one or more fans configured to draw air from the crown region to the outflow valve.

15. The aircraft of claim 1, wherein the duct defines a plurality of outlets, wherein the one or more valves are directly coupled to a first subset of the plurality of outlets, wherein the one or more cabin vents are coupled to the duct via a second subset of the plurality of outlets, and wherein the first subset of the plurality of outlets is distinct from the second subset of the plurality of outlets.

16. An aircraft comprising:
a fuselage including a crown region separated from a cabin region by at least a cabin ceiling structure;
a mixer configured to generate a mixed airflow;
a riser duct disposed within the fuselage and extending between at least the crown region and a first region of the fuselage, wherein the riser duct receives the mixed airflow;
one or more first vents disposed in the crown region and coupled to the riser duct, the one or more first vents configured to receive a first portion of the mixed airflow from the riser duct;
one or more second vents disposed in the cabin region and coupled to the riser duct, the one or more second vents configured to receive a second portion of the mixed airflow from the riser duct; and
one or more on-board air sources coupled to the riser duct and configured to, during operation in a drying mode, route the first portion of the mixed air through the riser duct from the first region of the fuselage to the crown region and the second portion of the mixed airflow to the cabin region via the one or more first vents and the one or more second vents, and configured to, during operation in a normal mode, route the second portion of the mixed air through the riser duct to the cabin region via the one or more second vents without provision of the first portion of the mixed air to the crown region via the one or more first vents.

17. The aircraft of claim 16, wherein the mixer receives recirculated airflow from the fuselage and airflow from the one or more on-board air sources.

18. The aircraft of claim 17, further comprising a heater coupled to the mixer, wherein the heater is configured to heat the recirculated airflow supplied to the mixer during operation in the drying mode.

19. The aircraft of claim 16, further comprising a ventilation duct in the crown region and one or more extraction vents coupled to the ventilation duct, wherein the extraction vents enable airflow into the ventilation duct during operation in the drying mode.

20. The aircraft of claim 16, further comprising a control system, wherein the control system is configured to change airflow positions of one or more valves to enable a change from the normal mode to the drying mode.

21. The aircraft of claim 20, further comprising one or more sensors positioned in the crown region, wherein the control system is configured to determine whether use of the drying mode is indicated based on data received from the one or more sensors.

22. The aircraft of claim 21, wherein the control system provides output to one or more user interface devices in response to a determination that use of the drying mode is indicated.

* * * * *